Jan. 31, 1967  B. G. COX  3,301,138
HYDRAULIC SYSTEM FOR RECIPROCATING A ROTATING SHAFT
Filed Dec. 11, 1964  2 Sheets-Sheet 1

INVENTOR.
BRADLEY G. COX
BY
*Learman, Learman & McCulloch*
ATTORNEYS

United States Patent Office 3,301,138
Patented Jan. 31, 1967

3,301,138
HYDRAULIC SYSTEM FOR RECIPROCATING A ROTATING SHAFT
Bradley G. Cox, Saginaw, Mich., assignor to Baker Perkins Inc., Saginaw, Mich., a corporation of New York
Filed Dec. 11, 1964, Ser. No. 417,717
13 Claims. (Cl. 91—221)

The present invention relates to means for reciprocating a shaft and in particular concerns a hydraulic system for reciprocating a rotating shaft.

There are numerous instances in which simultaneous rotation and reciprocation must be imparted to a shaft. For example, in mixers such as the continuous mixer disclosed in prior U.S. Patent No. 3,023,455 issued March 6, 1962, the main mixing shaft S must be continuously revolved and at the same time reciprocated along its longitudinal axis. When the mixing shaft is driven in this manner, any given point on the shaft will follow the "figure eight" path shown at $a$ in FIGURE 1 of the patent. A suitable mechanical arrangement providing for combined rotation and reciprocation of the shaft is illustrated in FIGURE 3 of the prior patent mentioned.

While the mechanical driving arrangement disclosed in U.S. Patent No. 3,023,455 has proven to be generally satisfactory, there remains a need for shaft driving means which will provide highly accurate control of the instantaneous reciprocatory velocities of the shaft S and which also will prevent damage to the mixing blades carried by the shaft if the blades become blocked by foreign matter.

In accordance with the present invention, the shaft driving system is hydraulic in nature rather than mechanical and acts to interrupt the driving of the shaft in response to any emergency condition, such as an abnormal load on the shaft or any blocking of the parts being driven. Moreover, this hydraulic driving system serves to control the reciprocatory motion of the shaft with greatly improved accuracy.

An object of the present invention is to provide an improved system for reciprocating a rotating shaft.

Another object is to provide hydraulic shaft driving means with which very accurate and continuous control over the reciprocating velocities of the shaft may be attained.

A further object of the invention is to provide a safety feature in a hydraulic shaft driving system of the character referred to which will prevent any damage to the parts being driven upon the occurrence of an abnormal load, jamming of the driven parts, or any other unusual or emergency condition.

Another object of the invention is to provide a hydraulic system for reciprocating and rotating a shaft which is of simple and reliable construction and which can be economically manufactured.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit thereof or the scope of the appended claims.

Figure 1:
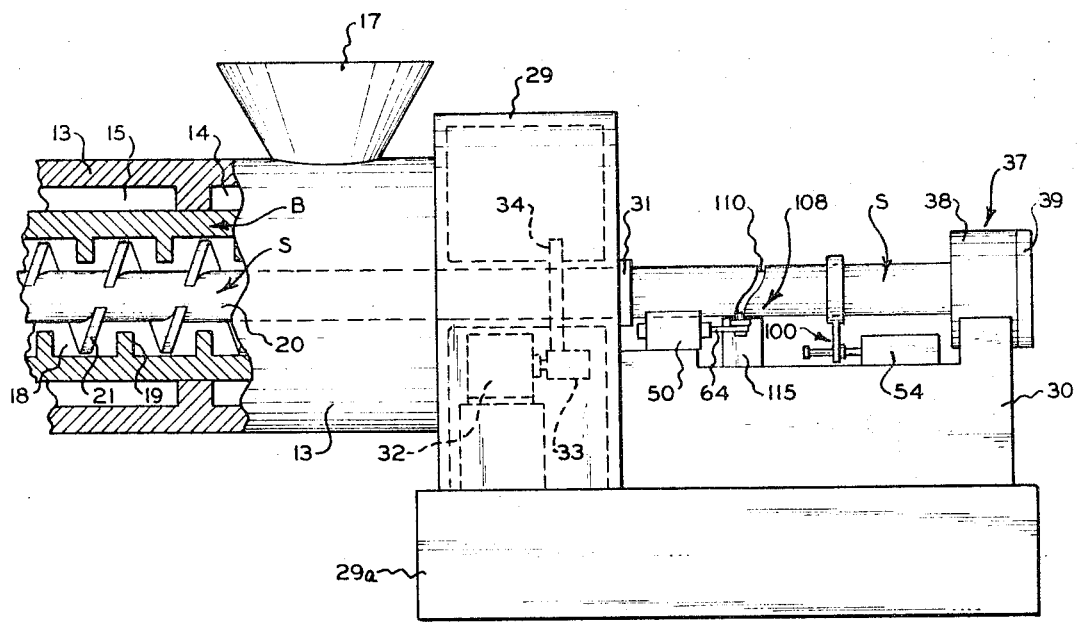
FIGURE 1 is a partly sectional, side elevational view of the hydraulic system of the invention shown mounted on a suitable frame and driving the main mixing shaft of the continuous mixer disclosed in U.S. Patent No. 3,023,-455.

Referring in detail to the drawings illustrating only a preferred embodiment of the invention, the hydraulic shaft driving system is mounted upon a support 30 which rests on the base 29a of the mixer of U.S. Patent No. 3,023,455. Only one end portion of the continuous mixer appears in FIGURE 1. The portion shown comprises a temperature regulating jacket or housing 13 carried by a casing 29 on the base 29a, a tubular mixing barrel B with kneading teeth 19 disposed inside jacket 13, and the main mixing shaft S journalled concentrically within the barrel B. The shaft S has a section 20 that is provided with mixing blades 21, and the material to be mixed is introduced into chamber 18 from feed hopper 17. Only as much of the mixer structure as will aid in understanding the present invention is shown and described herein; for a complete description of the mixer itself, reference should be had to Patent No. 3,023,455.

The shaft S is supported both for reciprocation and for rotation by bearings 31 supported in the front and rear walls of casing 29. Shaft S is continuously driven in rotation by an electric motor 32, the drive gear 33 of which engages a gear 34 fixed on the shaft. The drive gear is made sufficiently wider than the gear 34 to accommodate the longitudinal motion of shaft S. The electric motor and the coupling gears may conveniently be housed in casing 29.

Figure 2:
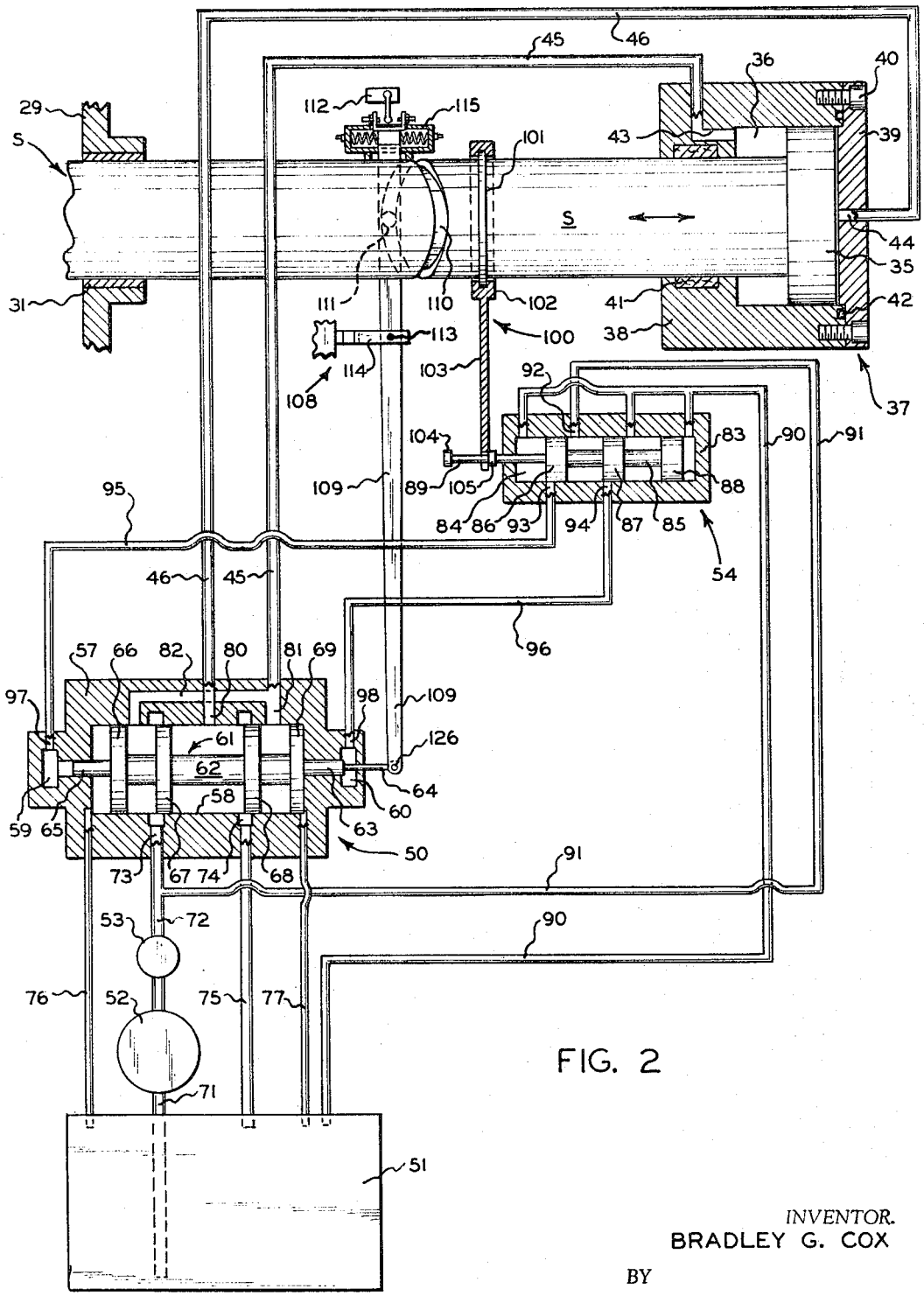
FIGURE 2 is a diagram of the hydraulic driving system in accordance with the invention.

Reference is now made to the diagram in FIGURE 2 of the hydraulic system of the invention which superimposes a reciprocatory motion upon the rotation of the driven shaft S. The shaft has an integral piston 35 at its outer end which is received within the chamber 36 of a pressure-tight cylinder 37. The cylinder is constructed in two parts 38 and 39 which enclose the piston and are fastened together as shown at 40. The cylinder part 38 rests upon the support 30 and contains an annular seal 41 placed in contact with shaft S. Another seal 42 is provided between part 38 and the removable end wall 39.

The cylinder 37 has a pair of channels 43 and 44 opening through ports into chamber 36 on opposite sides of the driving piston 35. A pair of fluid conducting pipes or conduits 45 and 46 engage these channels and connect the cylinder 37 to a control valve means in the form of a hydraulic monitor valve 50. The hydraulic system is arranged to apply fluid under pressure alternately to the opposite faces of piston 35 by way of the conduits 45 and 46. The system also includes a tank 51 to store the supply of hydraulic fluid, a constant high pressure pump 52, a pressure relief valve 53, and a pilot valve 54 which will be described in greater detail.

The monitor valve 50 comprises a hollow casing 57 with a central chamber 58 of large bore and two smaller end chambers 59 and 60. There are a number of ports in the wall of chamber 58 connecting the chamber through associated channels to the various external fluid conduits of the system. A movable valve element 61, constituted by an interior slide valve or valve piston, is mounted in chamber 58 for limited displacement back and forth along the aixs of the monitor valve. The slide valve or piston 61 includes a central shaft 62 having sections 63 and 64 of progressively smaller diameter at one end and a section 65 at the opposite end of the same diameter as section 63. The sections 63 and 65 are received in aligned bores through the end walls of chamber 58 leading into chambers 60 and 59, respectively. The shaft 62 supports four identical annular members 66, 67, 68, and 69 rigidly mounted thereon in the spaced positions shown in FIGURE 2. The peripheral surfaces of these annular members form "lands" which cooperate with the aforementioned ports, the members 66 to 69 being in close fitting but sliding contact with the wall of chamber 58. The smallest section 64 of shaft 62 extends beyond one end of the casing 57 for a purpose to be described.

Hydraulic fluid taken by the pump 52 from tank 51 via conduit 71 is transmitted under high pressure through a conduit 72, the interposed relief valve 53, and an inlet passage 73 into the chamber 58. An outlet passage 74 and its associated exhaust pipe 75 directly connect chamber 58 to tank 51, while two smaller drain pipes 76 and 77 lead from outlets at the opposite ends of chamber 58 to the tank. There are three channels 80, 81, and 82 on the opposite side of casing 57 which communicate through individual ports with the chamber 58, channel 82 being a branch of channel 81 as shown in FIGURE 2. Fluid pipe 46 connects the middle channel 80 to one end of cylinder 37, while the associated conduit 45 connects channels 81 and 82 to the other end of the cylinder.

The axial movements of the reciprocating slide valve 61 are partly governed by pilot valve 54. This pilot valve comprises a hollow casing 83 forming a chamber 84 which receives another interior slide valve or valve piston 85 carrying only three annular "lands" 86, 87, and 88. Slide valve 85 also has an extension 89 leading out through one end of the casing 83. There are three outlets at the upper side of casing 83 connected by a common exhaust pipe 90 to the tank 51. Pressure fluid from pump 52 is applied as the input to the pilot valve via a conduit 91 branching from conduit 72, the pressure fluid passing through the single inlet 92 into chamber 84 at a point intermediate the "lands" 86 and 87.

By means of its movable slide valve 85, the pilot valve 54 applies pressure alternately to the opposite end chambers 59 and 60 of monitor valve 50 and thus controls the movement of the other slide valve or valve piston 61. There are two passages 93 and 94 in the wall of casing 83 connected, respectively, by conduits 95 and 96 to the chambers 59 and 60 through channels 97 and 98 in casing 57. The momentary position of the slide valve 85 determines which one of the passages 93 and 94 receives the pressure fluid from inlet 92.

Shaft S supports a pilot valve actuator 100 adapted to move axially with the shaft, periodically shifting the position of the slide valve or valve piston 85 as the shaft approaches the end of each forward and rearward portion of a reciprocatory stroke. The actuator 100 comprises a flange or ring 101 that is rigid with the shaft and is freely rotatable in the inner groove of a surrounding annulus 102. An arm 103 integral with the annulus has a bifurcated free end in sliding contact with the extension 89 between two fixed stops 104 and 105 thereon. The spacing of the stops relative to the axial movements of the driven shaft is such that arm 103 engages one of the stops and shifts the position of slide valve 85 just before the piston 35 reaches either end of cylinder 37.

The displacement of slide valve 61 which thus is partly determined by the pilot valve 54 is further influenced, in accordance with the invention, by a novel control mechanism 108 connected to the outer section 64 of the monitor slide valve 61. This control mechanism in general comprises a pivoted lever 109, a cam groove 110 provided in the shaft S, a cam follower 111 in the form of a roller member carried on the lever 109 and traveling in the cam groove, a suspension arrangement receiving one end of lever 109 to control its pivotal motion, and an electrical switch 112 controlled by the lever 109. The cam groove 110 is accurately machined at the surface of shaft S along a preselected sine curve that is related to the desired velocity of reciprocation in a manner to be later described.

The control mechanism 108 of FIGURES 3 and 4 will now be described in greater detail. It is in essence a mechanical linkage that applies to the monitor valve 50 a velocity correcting control force generated, whenever required, by the action of the cam groove 110 upon its follower 111. The whole arrangement is such that reciprocatory movement of shaft S controls the monitor valve 50 which in turn controls further reciprocation of the shaft. The elongated lever 109 is pivotably mounted upon a pivot pin 113 carried by a fork shaped support bar 114, the latter bar being rigidly connected to a suitable part of the mixer frame as indicated by the broken lines in FIGURES 2–4.

The lever suspension arrangement further includes a housing 115 which contains a central rectangular aperture 116 formed between its two side walls 117 and 118, a cross plate 119 (see FIGURE 4) which joins the side walls near one end thereof serving as the bottom of aperture 116. Each side wall is connected at its other end to a part of the mixer frame, such as the support 30, so that the housing 115 is rigid with the frame. A cover plate 120 encloses lever 109 within the aperture 116 with one end extending beyond the housing, the lever thus being restricted to pivotal motion about the pivot pin 113.

A hollow cylindrical boss 117a is located on side wall 117 with its mouth opening into aperture 116 near one end thereof. The other side wall of housing 115 has a similar hollow boss 118a in alignment with boss 117a. The lever 109 is suspended within the aperture 116 by a pair of compression springs 121 disposed within bosses 117a, 118a and connected to pins 122 on the lever. The forces exerted by the suspension springs 121 are adjustable by means of stop pins 123 having threaded sections 124 passing through the end walls of the bosses.

The opposite end of the lever 109 is bifurcated so that the outer section 64 of monitor slide valve 61 may be received between forks 125 and connected thereto by a pin 126.

A stub shaft 127 carried on lever 109 at an intermediate point located nearer to housing 115 supports the aforementioned cam follower roller 111 in a position in which the latter remains engaged within the cam groove 110.

Figure 3:
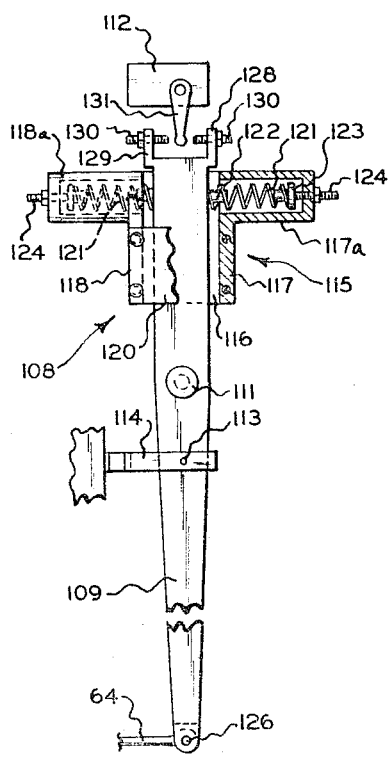
FIGURE 3 is a partly sectional, front elevational view of a control mechanism forming a part of the hydraulic system.
Figure 4:
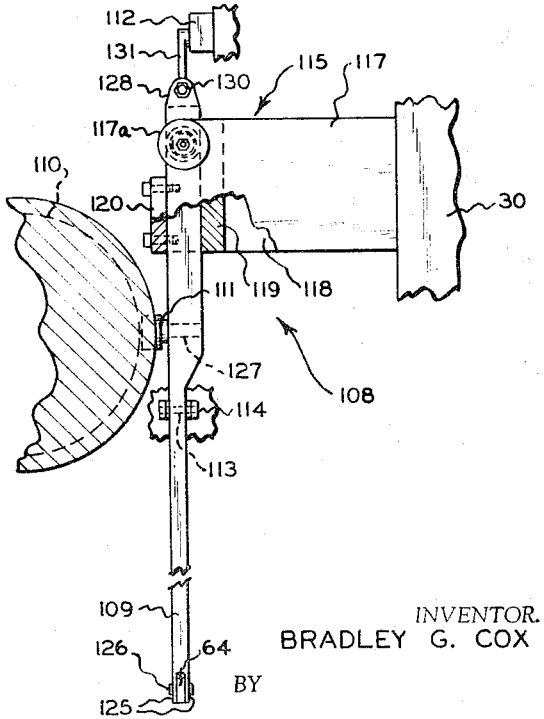
FIGURE 4 is a partly sectional, side elevational view of the control mechanism of FIGURE 3.

The electrical control switch 112 is a fixedly mounted limit switch arranged to be actuated by lever 109, but only if the lever is pivoted by more than a preselected amount away from the central position shown in FIGURE 3. The free end of lever 109 extending beyond housing 115 has a pair of spaced arms 128 and 129, each of which supports a threaded, switch actuating pin 130 received in a tapped hole through the arm. The switch contact controlling arm 131 of the limit switch fits between and is spaced by an adjustable amount from the ends of the two actuating pins 130.

In operation, the electric motor 32 drives shaft S in continuous rotation through gears 33 and 34. Throughout that half of the reciprocatory stroke in which the shaft S moves from left to right the interior slide valve 61 of monitor valve 50 maintains the position shown in FIGURE 2, provided that the speed of reciprocation is precisely correct so that control mechanism 108 does not exert any effective force on valve piston 61. The operation of control mechanism 108 in response to any incorrect speed of reciprocation will be explained subsequently. In FIGURE 2 the shaft S is shown as it just reaches the end of its linear motion to the right, monitor valve 50 is shown in the condition corresponding to shaft motion to the right, and interior slide valve 85 of the pilot valve is shown while being displaced from a left-hand position corresponding to shaft movement to the right toward a new position at the right end of chamber 84 which will cause shaft movement to the left, as is later described.

It will be readily seen that with the monitor valve in the condition shown in FIGURE 2, pressure is applied to the left face of piston 35. The pressure fluid coming from pump 52 passes through relief valve 53 and conduit 72 to monitor valve 50 where it enters inlet passage 73 and proceeds through that part of chamber 58 between "lands" 66 and 67 to channels 82 and 81, conduit 45, and channel 43 into the proper side of chamber 36. Exhaust fluid from cylinder 37 returns to tank 51 via channel 44, conduit 46, channel 80 of the monitor valve, chamber 58 between "lands" 67 and 68, outlet passage 74, and exhaust pipe 75.

It is to be understood that the interior slide valve 85 was previously placed in the extreme left-hand position within chamber 84 by the actuator 100 near the end of the immediately preceding movement by shaft S to the left. Thus throughout the major part of the shaft movement to the right now under consideration, slide valve 85 has remained stationary in its aforementioned left-hand position, the arm 103 sliding freely over extension 89 before reaching stop 105. Upon once having its interior slide valve positioned to the left in chamber 84, the pilot valve acts in the following manner to maintain the monitor valve 50 in the condition shown in FIGURE 2.

The fluid under pressure from the pump is transmitted by conduit 91 to pilot valve 54 where it enters the inlet 92 and, with slide valve 85 to the left, passes through chamber 84 between "lands" 86 and 87 to passage 93 and through conduit 95 and channel 97 to end chamber 59 of the monitor valve. The pressure in chamber 59 is applied to the end of section 65 to force the slide valve 61 into the position seen in FIGURE 2, causing the shaft to be driven to the right in the manner set forth above. Meanwhile, the other end chamber 60 exhausts to the tank 51 through channel 98, conduit 96, passage 94, chamber 84 between "lands" 87 and 88, and exhaust pipe 90.

Shaft S is driven to the right in FIGURE 2 until piston 35 approaches the end of cylinder 37, whereupon the arm 103 engages stop 105 and starts to displace interior slide valve 85 from the left end of the pilot valve chamber to the right end. As previously mentioned, FIGURE 2 shows slide valve 85 just before it reaches its right-hand position.

The arm 103 will continue to move with shaft S and will bring the slide valve 85 to the right-hand position, whereupon the pilot valve acts to reverse the pressure conditions in end chambers 59 and 60 and to set the monitor valve 50 into its other condition, causing the shaft to be driven to the left again. The fluid under pressure from conduit 91 now must pass through the pilot valve from inlet 92 and that part of chamber 84 between "lands" 86 and 87 to the other passage 94, since "lands" 86 and 87 have been moved sufficiently to cut off passage 93 from the inlet and connect passage 94 to the pressure inlet. The pressure fluid from passage 94 is transmitted by conduit 96 and channel 98 to the end chamber 60 of the monitor valve so that pressure is applied to the exposed annular area at the end of section 63 of the interior slide valve 61, i.e. the end face or shoulder between sections 63 and 64. As a result the slide valve or valve piston 61 is displaced from its FIGURE 2 position to the left until "land" 66 contacts the adjacent end wall of chamber 58. Meanwhile, end chamber 59 exhausts through channel 97, conduit 95, passage 93, chamber 84 between its left end wall and the "land" 86, and exhaust pipe 90 to tank 51.

In response to reversal of the condition of monitor valve 50, the shaft S is driven to the left by application of pressure to the right face of piston 35. The pressure fluid from pump 52 and conduit 72 again enters inlet passage 73, but now proceeds through chamber 58 between "lands" 67 and 68 which are positioned to communicate with chanel 80. The pressure fluid directed to channel 80 is transmitted by conduit 46 and channel 44 into the right end of chamber 36 to drive the shaft S to the left as required. The exhaust fluid from cylinder 37 returns to tank 51 through channel 43, conduit 45, channel 81, chamber 58 between "lands" 68 and 69, outlet passage 74, and exhaust pipe 75.

The shaft S continues to the left with the slide valve 61 in its left-hand position and the slide valve 85 in its right-hand position, until actuator 100 again displaces slide valve 85 at the end of the complete cycle being described. The latest reversal of pilot valve 54 initiates the next reciprocatory stroke.

The operations which have been described constitute the primary or basic control sequence for the reciprocation of shaft S, and they are followed without modification so long as the shaft is driven at the correct reciprocatory velocities throughout each stroke. As already mentioned, the cam groove 110 must be accurately formed so as to follow a preselected sine curve. This sine curve is so dimensioned with respect to the desired successive instantaneous velocities of each reciprocatory stroke that the roller member 111 engaged with the cam groove will remain stationary if the instantaneous axial and rotational velocities of the shaft are correct. In other words, cam groove 110 is so shaped that there will be no relative axial displacement by the different successive portions of its side walls as they pass a stationary observation point, provided that the shaft S is driven at the proper combination of rotational and reciprocatory velocities. Under such conditions the roller member is practically stationary and the control mechanism 108 does not affect the movements of valve piston 61 nor the functioning of the hydraulic monitor valve.

Under proper speed conditions, then, no lateral or transverse forces are exerted by the side walls of cam groove 110 upon the roller member 111. However, if a variation or departure from the desired reciprocatory velocity at any particular moment should occur, the novel control mechanism 108 of the invention will generate an additional control force (the previously mentioned velocity correcting control force) and apply it to valve piston 61 of the monitor valve. This velocity correcting force is superimposed upon the hydraulic control force associated with either end chamber 59 or 60.

The appearance of either overspeed or underspeed in shaft reciprocation causes a relative axial movement by the cam groove walls. As a result these walls will apply a lateral, velocity correcting force to the roller member 111, a force which causes lever 109 to pivot about its pivot pin 113. The lever is pivoted against the action of one of the springs 121 and displaces the interior slide valve 61 by a corresponding amount. The slide valve is displaced in the appropriate direction to readjust monitor valve 50 for an immediate change in the pressure applied to the main cylinder 37. The sense of the change in the applied pressure depends upon whether the velocity of the shaft is too high or too low, since this determines which side of roller member 111 receives the lateral force of a groove wall; the magnitude of the change is sufficient to restore the correct velocity of reciprocation. It has been found that a 'hunting" effect takes place so that the interior slide valve 61 is in motion almost constantly and provides continuous correction of the pressure applied to piston 35.

Considering the velocity correcting action of control mechanism 108 in greater detail, let it first be assumed that the shaft S is being driven from left to right but that the velocity of reciprocation is too high. Due to the overspeed, the left wall of the cam groove moves relatively to the right and forces follower or roller member 111 to the right, whereupon the lever 109 pivots clockwise about pivot pin 113. Lever 109 thus applies a velocity corretcing control force to the outer section 64 of monitor slide valve 61 so that the latter is immediately displaced to the left in chamber 58. The "land" 67, upon being moved across pressure inlet passage 73, progressively reduces the flow of pressure fluid into channel 82, channel 81, and conduit 45 leading to the left end of cylinder 37. The reduction in the driving force applied to piston 35 will permit the speed of shaft S to drop until the correct value is reached. As the shaft slows down, the cam groove returns follower 111 and lever 109 toward the normal central position established by springs 121, monitor slide valve 61 being moved back toward the position shown in FIGURE 2 to restore full driving pressure to cylinder 37.

The initial correcting force applied by lever 109 may be sufficiently large to displace "land" 67 to the left and beyond inlet 73, in which case the pressure fluid is cut off from channel 82 and directed into channel 80 to reverse the driving force applied to piston 35. The shaft S then will be positively braked and as it slows down the system is returned to the normal condition of FIGURE 2 in the same way as before. The monitor slide valve 61 continuously controls the driving force, either momentarily braking the piston or permitting it to proceed, so that the shaft S is reciprocated at the desired velocities determined by the configuration of cam groove 110.

When the shaft S is driven to the right but at a velocity which is too low, the cam groove walls move relatively to the left. The lever 109 tends to pivot counterclockwise, maintaining valve piston 61 at the extreme right end in chamber 58. The inlet passage 73 remains fully uncovered so that maximum driving pressure is transmitted through channels 82 and 81, conduit 45, and channel 43 for application to piston 35 until the proper velocity is reached.

It should be recalled that when the shaft velocity is correct, the control mechanism 108 does not apply any force to valve piston 61. As has been pointed out, at such times the roller member 111 is practically stationary. However, the lever 109 must pivot back and forth periodically due to the reciprocation by valve piston 61 from one end of chamber 58 to the other end under control of the pilot valve 54. But this pivoting motion of lever 109 whenever the direction of shaft movement is reversed does not alter the described cooperation of the cam groove and its follower because the distance separating roller member 111 and pivot pin 113 is made very small in comparison with the length of lever 109 between pin 113 and the lower end 125. Also, the corresponding displacements of pins 130 are not sufficient to actuate switch 112 since the lever arm between the upper end of lever 109 and pin 113 is short in comparison with the other lever arm between pivot pin 113 and the lower end 125.

Turning now to the operation when the shaft S is driven in the opposite direction, i.e. reciprocatory motion to the left, the valve piston 61 will have been shifted to the extreme left end of chamber 58 under control of the pilot valve in the manner already set forth. Therefore let it be assumed that the shaft S is being driven from right to left but that the veocity of reciprocation is too high. It will be seen that the cam groove walls move relatively to the left so that lever 109 is pivoted counterclockwise. The velocity correcting force applied by the lever 109 to section 64 displaces the monitor slide valve 61 to the right in chamber 58. As "land" 67 is moved to the right over pressure inlet passage 73, it progressively reduces the flow of pressure fluid into channel 80 and conduit 46 communicating with the right end of cylinder 37. The driving force is reduced and the shaft slows down until the correct velocity is reached, in the same manner as before. Again a large initial correcting force may displace "land" 67 to the right beyond inlet passage 73 and reverse the pressure in cylinder 37 to brake positively the shaft movement.

If shaft S is driven to the left at too low a velocity, the lever 109 will be pivoted clockwise and the valve piston 61 is held at the extreme left end of chamber 58 until the maximum driving pressure, continuously applied, increases the velocity to the proper value.

Thus the described system regulates the pressure applied to driving piston 35 so as to obtain reciprocation of shaft S at a basic rate and pattern and, by means of the control mechanism 108 with its cam groove, imposes a further control function that maintains the desired instantaneous velocities.

The present invention also provides a safety feature which has not been achieved in prior mechanical systems. The control mechanism 108 includes the electrical limit switch 112 mounted adjacent the free end of lever 109, its switch contact controlling arm 131 being positioned between the actuating pins 130 carried on the lever. The spacing of these pins 130 with respect to arm 131 is adjusted so that, for all the normal operations described above and involving pivotal motion by lever 109 against the springs 121, the pins 130 do not contact the switch control arm 131. As long as the lever 109 does not move beyond a predetermined amount from the central position of FIGURE 3, which predetermined amount is greater than that required for the normal operations, the limit switch 112 is not actuated. But if an abnormally large or small load were suddenly placed upon the shaft S (for example if the mixer blades 21 become blocked by foreign matter), there would be a large departure from the correct speed of reciprocation and the cam groove 110 would force a large pivotal displacement of lever 109. One or the other of pins 130, depending on the direction of lever movement, would contact arm 131 and actuate the limit switch 112 to shut down the system in any suitable manner. For example, the electrical switch 112 may be connected in circuit with motor 32 and with a second electric motor (not shown) driving the pump 52, so that when the switch 112 is actuated motor 32 is stopped and the second motor is disconnected from its power supply so that the pump 52 is stopped, thereby preventing any damage to the driven parts. Alternatively, the switch 112 might control an electrically actuated, normally closed valve in a bypass conduit connected between the pump output and the tank 51.

The extent of pivotal movement undergone by lever 109 in response to a given correcting force applied by cam groove 110 is determined by the compression springs 121 and may be adjusted by changing the setting of the threaded stop pins 123. In this way the amount of movement by valve piston 61 may be adjusted.

It is to be understood that various elements may be substituted for the elements which have been described and are claimed to accomplish the same or similar results without departing from the spirit of the invention or the scope of the appended claims.

I claim:

1. A hydraulic system for reciprocating a shaft comprising piston and cylinder means associated with said shaft; control valve means for delivering fluid under pressure alternately to opposite sides of said piston means; means for rotating said shaft and means including an element connected to said shaft to move in a reciprocating path therewith operatively connected to said control valve means for maintaining a predetermined velocity of shaft reciprocation.

2. A hydraulic system for reciprocating a shaft which is independently driven in rotation, said system comprising a shaft; piston and cylinder assembly means associated with said shaft for causing reciprocation thereof; means for rotating said shaft control means for delivering fluid under pressure to said cylinder and alternately to opposite sides of said piston and including a control mechanism sensitive to the speed of rotation of said shaft operatively connected to adjust said control means for maintaining predetermined speeds of reciprocation by said rotating shaft.

3. A hydraulic system for reciprocating a rotating shaft at predetermined values of instantaneous reciprocatory velocity which recur uniformly over successive cycles of reciprocation, said system comprising: piston and cylinder assembly means associated with said shaft for causing reciprocation thereof; control valve means connected to said assembly for delivering fluid under pressure alternately to opposite sides of said assembly; means for rotating the shaft; means responsive to the speed of reciprocating movement of said shaft for sensing the instantaneous reciprocatory velocity of said shaft at the speed of rotation thereof; and means responsive to said sensing means for adjusting said control valve means to maintain the instantaneous reciprocatory shaft velocity at said predetermined values for the speed of rotation thereof.

4. A hydraulic system for reciprocating a rotating shaft comprising a cylinder; a piston coupled to said shaft and mounted for reciprocation in said cylinder; fluid source means for delivering hydraulic fluid under pressure; control valve means including a movable valve element, for applying the fluid under pressure alternately to opposite sides of said piston in accordance with the position of said movable valve element; pilot valve means for applying the fluid under pressure alternately to opposite ends of said movable valve element depending upon the longitudinal position of said shaft; means associated with said shaft for defining the desired predetermined velocity of reciprocation by said shaft; and linkage means controlled by said predetermined velocity defining means for adjusting the position of said movable valve element to vary the volume applied to said piston so that the shaft reciprocates at said predetermined velocity.

5. A hydraulic system according to claim 4, wherein said predetermined velocity defining means comprises a cam groove formed in said shaft, and said linkage means comprises a lever arm connected at one end to said movable valve element, means for pivotally mounting said lever arm, and a roller member carried by said lever arm and positioned within said cam groove.

6. A hydraulic system for reciprocating a continuously rotating shaft comprising, in combination, a cylinder; a piston coupled to said shaft and mounted for reciprocation in said cylinder; a fluid source delivering fluid under pressure from a supply vessel; control valve means, having a movable valve element, for applying the fluid from said pump alternately to opposite faces of said piston depending upon the position of said movable valve element; pilot valve means for applying said fluid under pressure alternately to opposite ends of said movable valve element depending upon the axial positon of said shaft; and a control mechanism for maintaining predetermined values of instantaneous reciprocatory velocity by said shaft, said mechanism comprising a cam groove in said shaft following a predetermined curve, a pivoted lever connected at one end to said movable valve element, spring means for urging said lever to a central positon, and a cam follower roller carried by said lever and engaged in said cam groove.

7. A hydraulic system as claimed in claim 6, wherein said control mechanism further comprises electrical limit switch means responsive to a preselected amount of pivotal displacement by said lever for shutting down the hydraulic system.

8. A hydraulic system for simultaneously rotating and reciprocating a shaft, said system comprising means for continuously rotating said shaft; a cylinder; a piston integral with said shaft mounted for reciprocation inside said cylinder; a tank containing a supply of hydraulic fluid; a fluid source connected to said tank providing hydraulic fluid under pressure; control valve means, including a movable valve element, for delivering fluid under pressure from said fluid source alternately to opposite sides of said piston and returning exhaust fluid to said tank in accordance with the position of said element; pilot valve means for applying the fluid under pressure alternately to opposite ends of said element; means moving axially with the shaft for actuating said pilot valve means to reverse the application of fluid under pressure to said element at the end of each stroke of the reciprocated shaft; cam groove means on said shaft for defining the desired, predetermined values of axial shaft velocity throughout each cycle of reciprocation; linkage means connected to said movable valve element and operated by said cam groove means, for adjusting the instantaneous positions of said element so that the volume necessary to obtain said predetermined values is delivered to said piston; and control means actuated by said linkage means for stopping the delivery of fluid under pressure to said piston whenever the instantaneous axial velocity of the shaft departs by a preselected amount from the corresponding predetermined value.

9. A shaft driving arrangement for simultaneously rotating and reciprocating a shaft, comprising means for continuously rotating said shaft; a cylinder; a piston integral with said shaft mounted for reciprocation in said cylinder; a tank containing a supply of hydraulic fluid; a fluid source connected to said tank providing hydraulic fluid under pressure; control valve means, including a movable valve element, for delivering fluid under pressure from said fluid source alternately to opposite faces of said piston and returning exhaust fluid to said tank in accordance with the position of said element; pilot valve means for applying the fluid under pressure alternately to opposite ends of said element; means moving axially with the shaft for actuating the pilot valve means to reverse the application of fluid under pressure to said element at the end of each stroke of the reciprocated shaft; cam groove means carried by said shaft for defining a desired, predetermined axial velocity for the shaft; a pivoted lever arranged to adjust the instantaneous position of said movable valve element; means coupling said lever to said cam groove means for pivotally displacing the lever if the axial velocity of said shaft departs from said predetermined velocity, so that the volume necessary to return the shaft to said predetermined velocity is delivered to said piston; and electrical switch control means responsive to a preselected amount of pivotal displacement of said lever for stopping the delivery of fluid under pressure to said piston.

10. In a hydraulic system for reciprocating a rotating shaft which includes a cylinder, a piston coupled to the shaft and mounted within said cylinder, a fluid source supplying fluid under pressure, control valve means, including a movable valve element, for applying fluid from said fluid source alternately to opposite sides of said piston, and pilot valve means for controlling the position of said movable valve element in response to the axial movements of said shaft, the improvement comprising a control mechanism arranged to maintain the successive instantaneous reciprocatory velocities of said shaft at predetermined desired values and including a cam groove of predetermined shape formed in said shaft, a lever connected at one end to said movable valve element, means for pivotably mounting said lever, spring means for urging said lever to a central position, a cam follower roller carried by said lever arm and traveling within said cam groove, and an electrical limit switch mounted adjacent said lever, said switch being actuated only when said lever pivots by a preselected amount from said central position to shut down the hydraulic system.

11. A system for reciprocating a rotating shaft comprising: piston and cylinder assembly means associated with said shaft; control means for delivering fluid under pressure alternatively to opposite sides of said assembly means; means for rotating said shaft; and means responsive to the speed of movement of said shaft for disabling the delivery of fluid by said control means.

12. The combination defined in claim 11 in which said latter means also disables said means for rotating said shaft.

13. The combination defined in claim 11 in which said control means for delivering fluid under pressure is responsive to the speed of movement of said shaft to maintain a predetermined velocity of shaft reciprocation.

References Cited by the Examiner

UNITED STATES PATENTS

| | | | |
|---|---|---|---|
| 1,533,570 | 4/1925 | Prosser | 91—221 |
| 2,423,516 | 7/1947 | Naab et al. | 91—221 |
| 2,752,895 | 7/1956 | MacDuff | 91—304 |
| 2,803,110 | 8/1957 | Chittenden | 91—304 |

EDGAR W. GEOGHEGAN, *Primary Examiner.*

PAUL E. MASLOUSKY, *Examiner.*